C. G. SPRADO.
DISCHARGE VALVE.
APPLICATION FILED OCT. 27, 1911.
1,029,726.
Patented June 18, 1912.
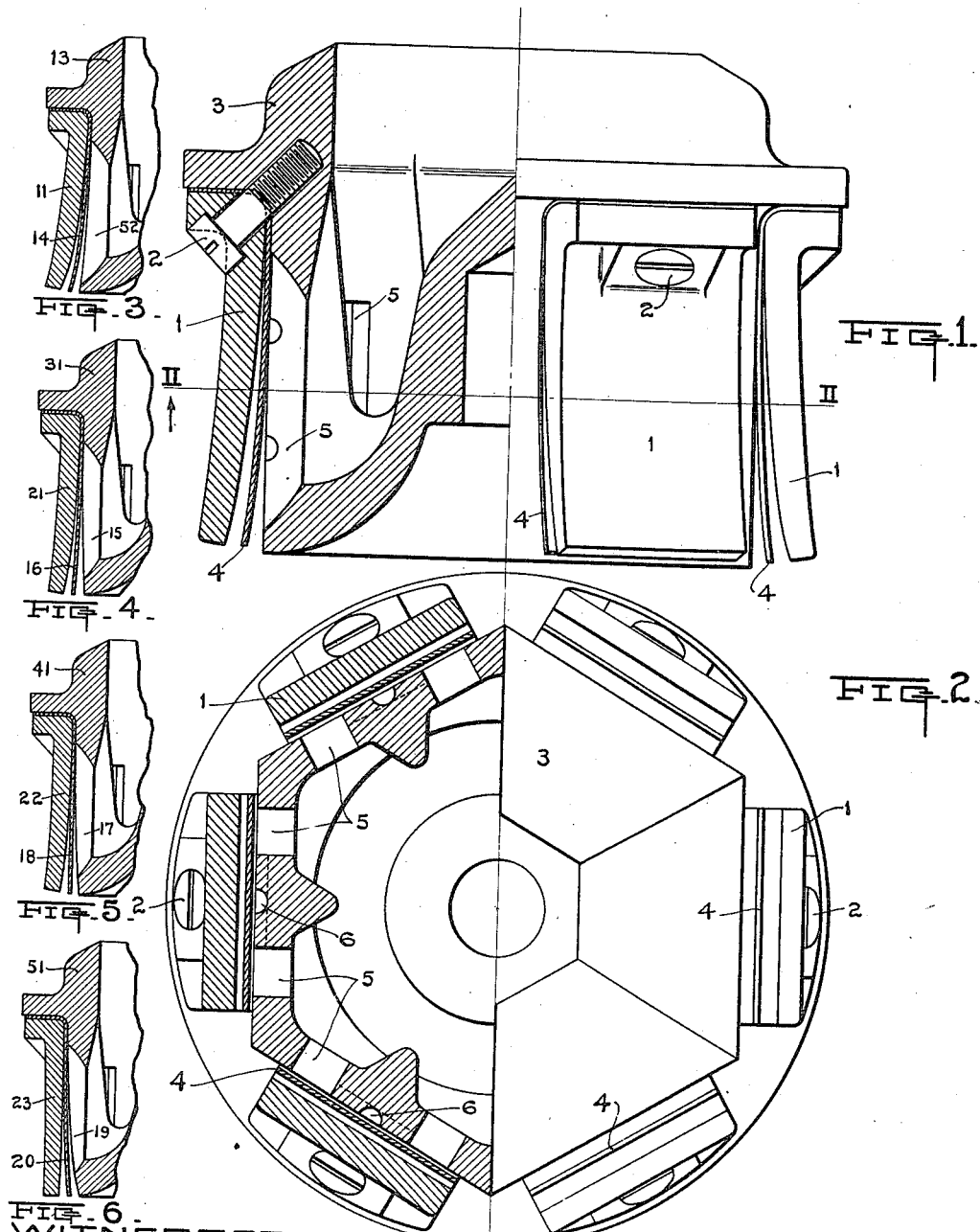
WITNESSES-
W. H. Lieber
Ella Brickell
INVENTOR-
C. G. Sprado
BY
ATTORNEY.

UNITED STATES PATENT OFFICE.

CARL G. SPRADO, OF MILWAUKEE, WISCONSIN, ASSIGNOR TO ALLIS-CHALMERS COMPANY, OF MILWAUKEE, WISCONSIN, A CORPORATION OF NEW JERSEY.

DISCHARGE-VALVE.

1,029,726.    Specification of Letters Patent.    Patented June 18, 1912.

Application filed October 27, 1911. Serial No. 657,173.

*To all whom it may concern:*

Be it known that I, CARL G. SPRADO, a citizen of the United States, residing at Milwaukee, in the county of Milwaukee and State of Wisconsin, have invented a certain new and useful Improvement in Discharge-Valves, of which the following is a specification.

This invention relates to improvements in the construction of air discharge valves for high speed blowing engines.

The object of the invention is to provide an air discharge valve for blowing engines, which is simple in construction, efficient in operation, and which is particularly adapted to operate under high pressure and at high speeds.

The invention consists essentially in providing an ordinary flap valve with an initial set away from its seat so that the valve in closing will have an unrolling motion on the seat, thereby retarding the velocity with which the valve strikes.

A clear conception of several embodiments of the invention may be had by referring to the drawing accompanying and forming a part of this specification, in which like reference characters designate the same or similar parts in the different views.

Figure 1 is a side view, partly in section, of a blowing engine valve cage having a series of valves constructed in accordance with this invention applied thereto. Fig. 2 is an end view of a blowing engine valve cage with valves secured thereto, a portion of the device being shown in section, the section being taken along the line 2—2 of Fig. 1 looking in the direction of the arrow. Figs. 3, 4, 5 and 6 disclose central sections through fragments of modified forms of valve cages, valves and valve stops.

The blowing engine valve cage 3, which is adapted to be secured in the blowing engine cylinder head in the usual manner, has a hexagonal portion the outer surfaces of which form a series of valve seats. Ports 5 connect the interior of the cage 3, which is normally in open communication with the interior of the blowing cylinder, with the discharge chamber which normally surrounds the hexagonal portion of the cage 3. Grooves 6 are formed in the portions of the valve seats intermediate the ports 5, and serve to relieve the suction between the valves and their seats during opening.

The flap valves 4 are preferably formed of sheet metal and have a natural bias positioning them away from their seats being convexly curved relative to their plane seats so that with the valves 4 in inactive position, as shown, they are not in contact with their adjacent seats. The valves 4 may therefore be said to have an initial set away from their respective seats. The valve stops 1 have curved surfaces on their sides adjacent the flap valves 4 and are secured to the cage 3 by any suitable means, as by machine screws 2. The valves 4 have end portions which project between the clamping surfaces of the valve stops 1 and the cage 3, thus providing securing means for the valves 4.

During the normal operation of the compressor, the high pressure in the discharge chamber which surrounds the valve cage 3, tends to keep the valves 4 against the adjacent valve seats formed on the cage 3. As the pressure within the cage 3 is, by the forward motion of the piston of the blowing engine, brought up to a pressure substantially equal to that in the discharge chamber, the initial set or curvature of the valves 4 causes these valves to take the position shown in Fig. 1. Any increase in the pressure within the cage 3 will, after such positioning of the valves 4, cause the air from within the cage 3 to flow into the discharge chamber. Such passage of air through the ports 5 will cause the valves 4 to be opened still farther until they contact with the curved surfaces of their adjacent valve stops 1. As the pressure within the cage 3 decreases, the valves 4 recede from their corresponding stops 1, being eventually brought in contact with their seats by the high pressure within the discharge chamber.

In the form of the invention disclosed in Fig. 3, the valve cage 13 is provided with concavely curved valve seats instead of plane seats as disclosed in Figs. 1 and 2. The valves 14 are convexly curved toward their adjacent seats and are provided with convexly curved stops 11. The valves 14 are so formed that their curvature of convexity is greater than the curvature of concavity of their adjacent seats, thus giving the valves 14 an initial set away from their seats while in inactive position, as shown.

In the form of invention disclosed in Fig. 4, the valve cage 31 is provided with convexly curved seats adjacent the ports 15.

The valves 16 are convexly curved toward their adjacent seats and are provided with convexly curved stops 21. By forming the valves 16 with convex seating surfaces adjacent convexly curved seats on the cage 31, the valves have an initial set away from their seats while in inactive position, as shown.

In the form of the invention disclosed in Fig. 5, the valve cage 41 is provided with convexly curved seats adjacent the ports 17. The valves 18 are formed with plane seating surfaces and have convexly curved adjacent stop 22. By forming the valves 18 with plane seating surfaces and the adjacent valve seats convexly curved, the valves 18 have an initial set away from their seats while in inactive position, as shown.

In the form of the invention disclosed in Fig. 6, the valve cage 51 is provided with convexly curved seats adjacent the ports 19. The valves 20 are concavely curved relative to their adjacent seats and are provided with stops 23 having either plane or curved stopping surfaces for the valves 20. The valves 20 are so formed that their curvature of concavity is less than the curvature of convexity of the adjacent seats, thus giving the valve 20 an initial set away from their seats while in inactive position, as shown.

It will be noted that by giving the valves an initial set away from their seats, the valves while seating will be brought gradually against their seats, the outer free ends of the valves being the last portions thereof to contact with the seats. In this way the valves may be said to have an unrolling motion which tends to bring the seating surface of the valve into gradual contact with the seat, thereby retarding the velocity with which the valves strike their seat. In opening, the valves are partially opened at the instant the pressure within the piston chamber balances the pressure within the discharge chamber, thereby permitting discharge of the air from within the blower cylinder at the most effective moment. The curvature of the valves in opening as in closing thereof, will tend to retard the velocity with which the valves strike their adjacent valve stops. This effect is brought about in the opening of the valves by forming the stop surfaces of the valve stops of slightly greater curvature than the adjacent surfaces of the valves.

It should be noted that with the valves constructed with an initial set and operating as above described, a construction well adapted to operate under high pressures and high speeds is provided, since such construction of the valves reduces the pounding or impact of the valves against their seats to a minimum.

Since it is rather difficult to form a valve seat having a curved seating surface, it would probably be preferable in most cases to use the construction disclosed in Figs. 1 and 2, although applicant does not desire to limit the scope of his invention to such construction. All of the forms of the invention disclosed would be equally efficient in operation, since in each case the valve has an initial set away from its adjacent valve seat.

It should be understood that it is not desired to be limited to the exact details of construction shown and described, for obvious modifications will occur to a person skilled in the art.

It is claimed and desired to secure by Letters Patent,—

1. In a blowing engine, a valve, and a seat for sale valve, said valve having at one portion thereof an initial set away from said seat whereby a free passage exists between said valve and seat when the pressures on opposite sides of the valve are equalized.

2. In a blowing engine, a curved valve, and a plane seat for said valve, said valve having its curved portion free from engagement with said seat whereby a free passage exists between said valve and seat when the pressures on opposite sides of the valve are equalized.

3. In a blowing engine, a sheet metal valve, and a seat spaced from said valve, said valve having a portion free from engagement with said seat whereby a free passage exists between said valve and seat when the pressures on opposite sides of the valve are equalized.

4. In a blowing engine, a curved valve, and a plane seat for said valve, said valve at one end being fastened to said seat and having its curved portion free from engagement with said seat when the pressures on opposite sides of the valve are equalized.

5. In a blowing engine, a valve, and a seat for said valve, said valve being fastened to said seat at one portion thereof and having at another portion thereof an initial set away from the seating surface.

6. In a blowing engine, a valve having a natural bias positioning same away from its seating surface to form, at the time the pressures on opposite sides of the valve are equalized, a free passage permitting discharge between said valve and seating surface.

In testimony whereof, the signature of the inventor is affixed hereto in the presence of two witnesses.

CARL G. SPRADO.

Witnesses:
W. H. LIEBER,
R. F. SMITH.

It is hereby certified that in Letters Patent No. 1,029,726, granted June 18, 1912, upon the application of Carl G. Sprado, of Milwaukee, Wisconsin, for an improvement in "Discharge-Valves," an error appears in the printed specification requiring correction as follows: Page 2, line 83, for the word "sale," read *said;* and that the said Letters Patent should be read with this correction therein that the same may conform to the record of the case in the Patent Office.

Signed and sealed this 23rd day of July, A. D., 1912.

[SEAL.]

C. C. BILLINGS,
*Acting Commissioner of Patents.*